(12) United States Patent
Hancock et al.

(10) Patent No.: US 7,100,808 B2
(45) Date of Patent: Sep. 5, 2006

(54) MULTIPLE USE BASE HOLDER SYSTEM

(75) Inventors: Dennis Hancock, Mountain Green, UT (US); Jefferey D. Hancock, Uintah, UT (US)

(73) Assignee: Stearns Inc., Sauk Rapids, MN (US)

( * ) Notice: Subject to any disclaimer, the term of this patent is extended or adjusted under 35 U.S.C. 154(b) by 37 days.

(21) Appl. No.: 10/035,290

(22) Filed: Jan. 3, 2002

(65) Prior Publication Data

US 2002/0053628 A1 May 9, 2002

Related U.S. Application Data

(62) Division of application No. 09/460,501, filed on Dec. 14, 1999, now Pat. No. 6,382,488.

(51) Int. Cl.
*B60R 11/00* (2006.01)

(52) U.S. Cl. .................. 224/547; 224/553; 224/567; 410/116; 24/265 CD

(58) Field of Classification Search .............. 248/214, 248/222.52, 227.4, 231.71, 689, 74.2, 230.5, 248/230.6, 219.4; 224/547, 548, 552, 553, 224/558, 567, 570, 571; D8/395, 396; 410/97, 410/101, 102, 106, 110, 116; 24/115 R, 265 CD
See application file for complete search history.

(56) References Cited

U.S. PATENT DOCUMENTS

| 492,740 | A | | 2/1893 | Copeland |
| 553,614 | A | | 1/1896 | Handloser |
| 1,008,604 | A | | 11/1911 | Lake |
| 2,274,605 | A | | 2/1942 | Hoffmeister |
| 2,708,088 | A | | 5/1955 | Steinke |
| 2,733,034 | A | * | 1/1956 | Tormo ........................ 248/72 |
| 3,018,081 | A | * | 1/1962 | Waldbauer ............... 248/230.5 |
| 3,063,569 | A | | 11/1962 | Huber |
| 3,096,960 | A | | 7/1963 | Kinney |
| 3,237,899 | A | | 3/1966 | Lewis |
| 3,266,633 | A | | 8/1966 | Graebner |
| 3,294,247 | A | | 12/1966 | Norrington |
| 3,361,265 | A | | 1/1968 | Wernimont |
| 3,365,761 | A | | 1/1968 | Kalvig |
| 3,701,436 | A | | 10/1972 | Adams |
| 3,744,687 | A | | 7/1973 | Oreck |
| 3,860,209 | A | * | 1/1975 | Strecker ............... 24/265 CD |
| 3,876,079 | A | | 4/1975 | Elkins et al. |
| D238,228 | S | | 12/1975 | Elkins et al. |
| 3,995,742 | A | | 12/1976 | Austin et al. |
| 4,025,015 | A | | 5/1977 | Kolic |
| 4,084,735 | A | | 4/1978 | Kappas |
| 4,108,313 | A | | 8/1978 | Bogar, Jr. |
| 4,247,030 | A | | 1/1981 | Amacker |
| 4,262,385 | A | | 4/1981 | Norman |
| 4,271,997 | A | | 6/1981 | Michael |

(Continued)

FOREIGN PATENT DOCUMENTS

| GB | 104044 | 2/1917 |
| GB | 1040333 | 8/1966 |

OTHER PUBLICATIONS

"SIngle Pack Rack®," *All Rite Products –Original ATV Gear*, http://www.allriteproducts.com/pr1 html, a page (Last printed Nov. 29, 2004).

(Continued)

*Primary Examiner*—Anita M. King
(74) *Attorney, Agent, or Firm*—Merchant & Gould P.C.

(57) ABSTRACT

A holding base system comprising a platform with an exteriorly splined post projecting therefrom and mounting means for securing the platform to a surface; an article holder having a splined inner wall on a bottom thereof to fit on and cooperate with the splined post and a top thereof shaped and constructed to secure an article to be supported, with the orientation of the supported article being determined by the relative positioning of the splined socket to the splined post.

10 Claims, 6 Drawing Sheets

U.S. PATENT DOCUMENTS

| | | | | |
|---|---|---|---|---|
| 4,325,484 | A | 4/1982 | Berry | |
| 4,358,080 | A * | 11/1982 | Wolker | 174/166 R |
| 4,400,856 | A * | 8/1983 | Tseng | 24/109 |
| 4,429,638 | A | 2/1984 | Licari | |
| 4,450,989 | A | 5/1984 | Bogar, Jr. | |
| 4,460,142 | A * | 7/1984 | O'Rorke | 248/214 |
| 4,470,179 | A * | 9/1984 | Gollin et al. | 24/297 |
| 4,527,760 | A * | 7/1985 | Salacuse | 248/108 |
| 4,550,891 | A * | 11/1985 | Schaty | 174/166 R |
| 4,566,660 | A * | 1/1986 | Anscher et al. | 24/453 |
| 4,597,496 | A | 7/1986 | Kaplan | |
| 4,599,920 | A | 7/1986 | Schmid | |
| 4,607,772 | A | 8/1986 | Hancock | |
| 4,614,321 | A * | 9/1986 | Andre | 24/555 |
| 4,630,982 | A * | 12/1986 | Fenner | 24/265 CD |
| 4,667,530 | A * | 5/1987 | Mettler et al. | 74/493 |
| 4,691,887 | A | 9/1987 | Bessinger | |
| 4,768,741 | A * | 9/1988 | Logsdon | 24/16 PB |
| 4,776,471 | A | 10/1988 | Elkins | |
| 4,823,673 | A | 4/1989 | Downing | |
| 4,827,654 | A * | 5/1989 | Roberts | 248/514 |
| 4,852,291 | A * | 8/1989 | Mengo | 43/21.2 |
| 4,860,985 | A * | 8/1989 | Olson et al. | 248/214 |
| 4,877,361 | A * | 10/1989 | DeRosa et al. | 410/112 |
| 4,881,386 | A | 11/1989 | Glines | |
| 4,901,970 | A * | 2/1990 | Moss et al. | 248/514 |
| 4,915,273 | A | 4/1990 | Allen | |
| 4,958,758 | A | 9/1990 | Tipple et al. | |
| 4,991,723 | A | 2/1991 | Elkins | |
| 5,078,279 | A | 1/1992 | Hancock et al. | |
| 5,130,899 | A * | 7/1992 | Larkin et al. | 224/183 |
| 5,275,367 | A | 1/1994 | Frye | |
| 5,344,032 | A | 9/1994 | Ramsdell | |
| 5,370,240 | A | 12/1994 | Hand | |
| D357,802 | S * | 5/1995 | Todd et al. | D22/107 |
| D371,137 | S | 6/1996 | Kriegh | |
| 5,524,772 | A | 6/1996 | Simmons | |
| D386,298 | S | 11/1997 | Hancock | |
| D386,304 | S | 11/1997 | Hancock | |
| 5,697,181 | A | 12/1997 | Savant | |
| 5,704,573 | A * | 1/1998 | de Beers et al. | 248/73 |
| 5,706,990 | A | 1/1998 | Lahrson | |
| 5,898,975 | A | 5/1999 | Hancock | |
| 5,915,572 | A | 6/1999 | Hancock | |
| 6,021,936 | A | 2/2000 | Savant | |
| 6,142,349 | A | 11/2000 | Roberson | |
| 6,145,718 | A | 11/2000 | Edwards | |
| 6,199,734 | B1 | 3/2001 | Meeks | |
| 6,241,616 | B1 * | 6/2001 | Lightcap | 464/162 |
| 6,338,218 | B1 * | 1/2002 | Hegler | 42/94 |
| 6,382,484 | B1 | 5/2002 | Savant | |
| 6,382,488 | B1 | 5/2002 | Hancock | |
| 6,457,618 | B1 | 10/2002 | Hancock et al. | |
| 6,484,913 | B1 | 11/2002 | Hancock et al. | |
| D466,856 | S | 12/2002 | Gates et al. | |
| D476,290 | S | 6/2003 | Gates et al. | |
| 6,588,637 | B1 | 7/2003 | Gates et al. | |
| 6,637,146 | B1 * | 10/2003 | Ernst | 43/21.2 |
| 6,637,707 | B1 | 10/2003 | Gates et al. | |
| 6,695,183 | B1 | 2/2004 | Hancock et al. | |
| 6,789,712 | B1 | 9/2004 | Gates et al. | |
| 6,793,109 | B1 | 9/2004 | Gates et al. | |
| 6,945,441 | B1 * | 9/2005 | Gates et al. | 224/401 |
| 2003/0042282 | A1 | 3/2003 | Gates et al. | |
| 2003/0146364 | A1 | 8/2003 | Gates et al. | |
| 2003/0218112 | A1 | 11/2003 | Gates et al. | |
| 2004/0113041 | A1 | 6/2004 | Hancock et al. | |

OTHER PUBLICATIONS

"Pack Rack ®Plus +," *All Rite Products –Original ATV Gear*, http://www.allriteproducts.com/prp 1.html, 1 page (Last printed Nov. 29, 2004).

"Double Pack Rack ®," *All Rite Products –Original ATV Gear*, http://www.allriteproducts.com/pr2.html, 1 page (Last printed Nov. 29, 2004.

"Pack Rack® Flat," *All Rite Products –Original ATV Gear*, http://www.allriteproducts.com/pr 1 f.html, 1 page (Last printed Nov. 29, 2004).

"The Magnum Pack Rack®, " *All Rite Products –Original ATV Gear*, http://www.allriteproducts.com/mpr 1.html, 1 page (Last printed Nov. 29, 2004).

"Graspur All Terrain Single," *All Rite Products –Original ATV Gear*, http://www.allriteproducts.com/AT1.html, 1 page (Last printed Nov. 29, 2004).

"Graspur All Terrain Double," *All Rite Products –Original ATV Gear*, http://www.allriteproducts.com/AT2.html, 1 page (Last printed Nov. 29, 2004).

"Tree Stand Pack Rack®," *All Rite Products –Original ATV Gear*, http://www.allriteproducts.com/TR 1. html, 1 page (Last printed Nov. 29, 2004).

"All Terrain™ Treestand Rack, " *All Rite Products –Original ATV Gear*, http://www.allriteproducts.com/ATT.html, 1 page (Last printed Nov. 29, 2004).

"All Terrain™ Kickboat Rack," *All Rite Products –Original ATV Gear*, htto://www.allriteproducts.com/ATM 1.html, 1 page (Last printed Nov. 29, 2004).

"All Terrain™ Truck Taped Gun/Bow Rack," *All Rite Products –Original ATV Gear*, http://www.allriteproducts.com/tt 1.html, 1 page (Last printed Nov. 29, 2004).

"All Terrain™ Truck Suction Cup Gun/Bow Rack," *All Rite Products –Original ATV Gear*, htto://www.allriteproducts.com/ts 1/html, 1 page (Last printed Nov. 29, 2004).

"ATV Seefari® Monopod," *All Rite Products –Original ATV Gear*, http://www.allriteproducts.com/asm.html, 1 page (Last printed Nov. 29, 2004).

"V–rest attachment for Seefari®, " *All Rite Products –Original ATV Gear*, http://www.allriteproducts.com/vrs.html, 1 page (Last printed Nov. 29, 2004).

* cited by examiner

MULTIPLE USE BASE HOLDER SYSTEM

CROSS REFERENCE TO RELATED APPLICATIONS

This application is a division of application Ser. No. 09/460,501, filed Dec. 14, 1999 now U.S. Pat. No. 6,382,488.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to holding devices and is particularly related to holding base systems that can be quickly and easily mounted to a variety of surfaces to receive a wide range of clamping devices that are used to secure other objects in place.

BRIEF SUMMARY OF THE INVENTION

Principal objects of the present invention are to provide a holding base that is readily and easily connected to a variety of support surfaces and that will then receive articles to be secured, or a variety of clamping devices that will hold articles to be secured to the support surfaces. The articles to be held may include clamping devices that will secure other articles in place in a selected orientation or may be other articles themselves that are positioned in a selected orientation with respect to the surfaces.

Yet other objects of the invention are to provide a holding base that is particularly suited to attachment to vehicles and even more particularly to bicycles, motorcycles and off-highway vehicles, so that articles such as containers, fishing equipment, tools, guns, safety equipment, cameras, telephones, pagers, position locators, water bottles and other convenience items can be readily attached to the vehicle for carrying and/or use purposes and that can be easily and quickly removed from the vehicle.

Still other objects are to provide a holding base system that may be fitted with different types of anchor straps to pass around and to tightly grip articles secured to a support surface such as a vehicle.

Yet other objects are to provide a clamping device that is rotated with respect to the holding base, as desired, to insure secure holding of objects held by the clamping device, or a plurality of clamping devices, in a selected orientation.

Principle features of the invention include a base unit with a platform having holes therethrough to receive the ends of a U-bolt clamp, or to receive screws or bolts to secure the base unit to a surface on which the unit is mounted. A shaft extending from the platform is exteriorly splined and has a central hole therethrough to receive and secure an article to be mounted to the surface or to receive an article holder.

The article holder may include a socket with an encircling wall projecting from a base of the socket and the wall having a splined interior. The top of the socket has a hole therethrough. A resilient block fits snugly into a top of the socket and may be bolted in place. A V-notch in the top of the block receives an article to be mounted to the surface to which the base unit is secured. A pair of oppositely extending flexible gripper straps project from opposite sides of the block and the V-notch to provide means for anchoring a selected article to the resilient block. Each gripper strap has at least a pair of spaced apart projections along outer edges thereof to serve as positioners for an independent strap that is secured to the base of the socket and that passes around the gripper straps to secure objects held within the gripper straps to a surface. A rigid band formed around the periphery of the socket is connected to three corners of the base and is spaced from three sides. The band is fully secured to the other side of the base and has a hook thereon to cooperate with an expandable independent strap.

Alternatively, a flexible strap having hook and loop connectors can be easily used.

The holding base unit is quickly and easily attached to and removed from a desired surface. When attached to the surface one or more of the holding base units readily receive other articles, or other article holders, having an interiorly splined socket that will fit onto the shaft. Because of the cooperating splined post or shaft and socket, secure holding is achieved even though the article or article holder being attached to the holding base unit may be rotated to a desired position before the matching splined components are telescoped and bolted together. The block of the article holder may be oriented with respect to the socket, as desired, to permit use of a selected independent strap.

In another embodiment, the article holder may include a socket with an interior wall with splines that cooperate with the exterior splines of the shaft projecting from the platform of the base holding unit. Bifurcated arms, with or without interiorly extending flexible vanes extend from the socket to receive an article, or articles, to be held.

A T-bar adapter provides a means for interconnecting a single base holding unit to a plurality of article holders.

Additional objects and features of the invention will become apparent to those skilled in the art to which the invention pertains from the following detailed description and drawings.

DETAILED DESCRIPTION OF THE INVENTION

Figure 1:
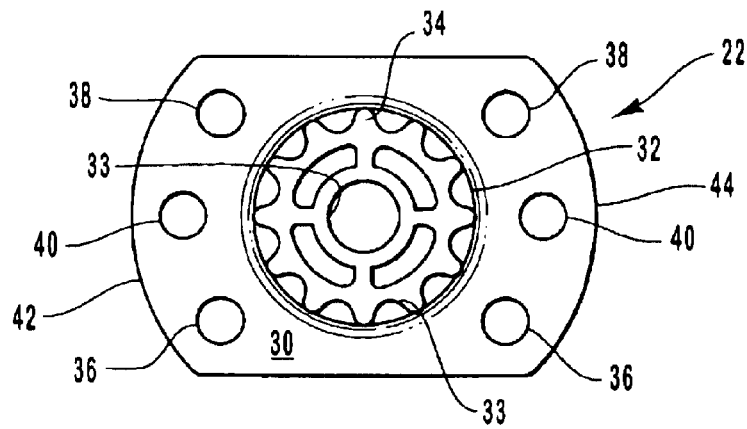
FIG. 1 is a top view of a holding base unit of the holder base system of the invention.

Referring now to the drawings:

In the illustrated preferred embodiments of the invention, the holding base system is shown generally at 20 in FIGS. 8–11.

In the embodiment of the invention shown in FIGS. 1–7 the holding base system 20 includes a base holding unit 22, and an article holder 24.

In the embodiment of the invention shown in FIGS. 8–11 a pair of spaced apart base holding units 22 each include an article holder 26.

Figure 2:
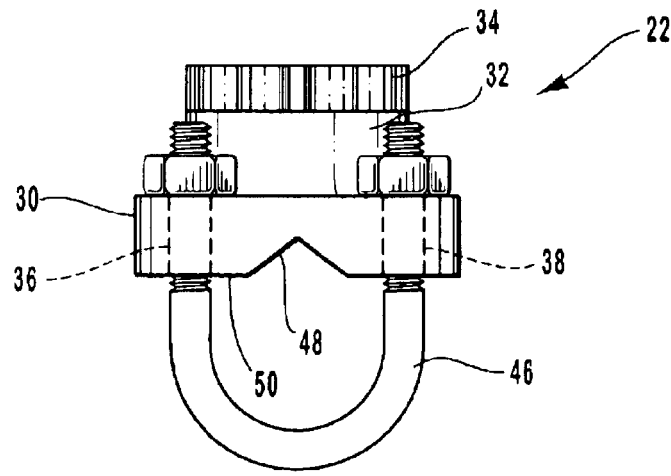
FIG. 2, an end elevation view of the holding base unit.
Figure 3:
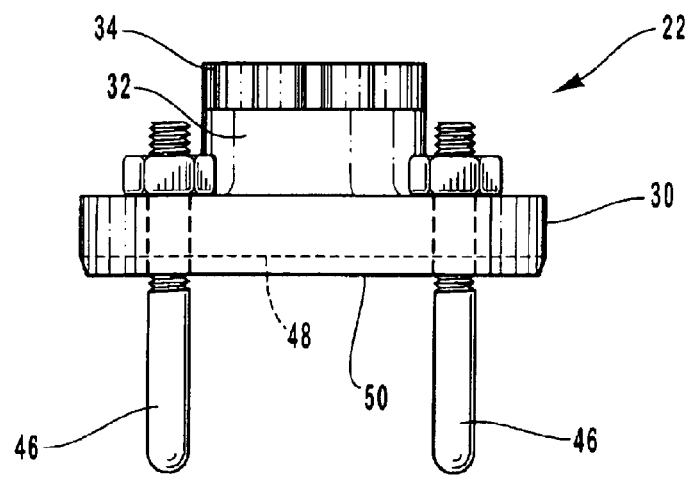
FIG. 3, a side elevation view.

Each base holding unit 22, which may be made of durable plastic material, has a platform 30 from which a shaft 32 projects. The upper end of shaft 32 has splines 34 therearound, extending parallel to a central hole 33 through the shaft 32 and platform 30. Additional holes 36, 38, and 40 extend through opposite ends 42 and 44 of the platform 30. As shown in FIGS. 2 and 3, U-bolts 46, inserted through the holes 36 and 38 can be used to clamp the platform 30 to a bar (not shown in FIGS. 2 and 3), such as forms the handlebars of a vehicle, with a V-groove 48 formed in a bottom 50 of the platform straddling the bar. Alternatively, screws or bolts (not shown) inserted through all or selected ones of the holes 36, 38 and 40 may be used to secure the platform to a selected surface to which the base holding system is attached.

Figure 4:
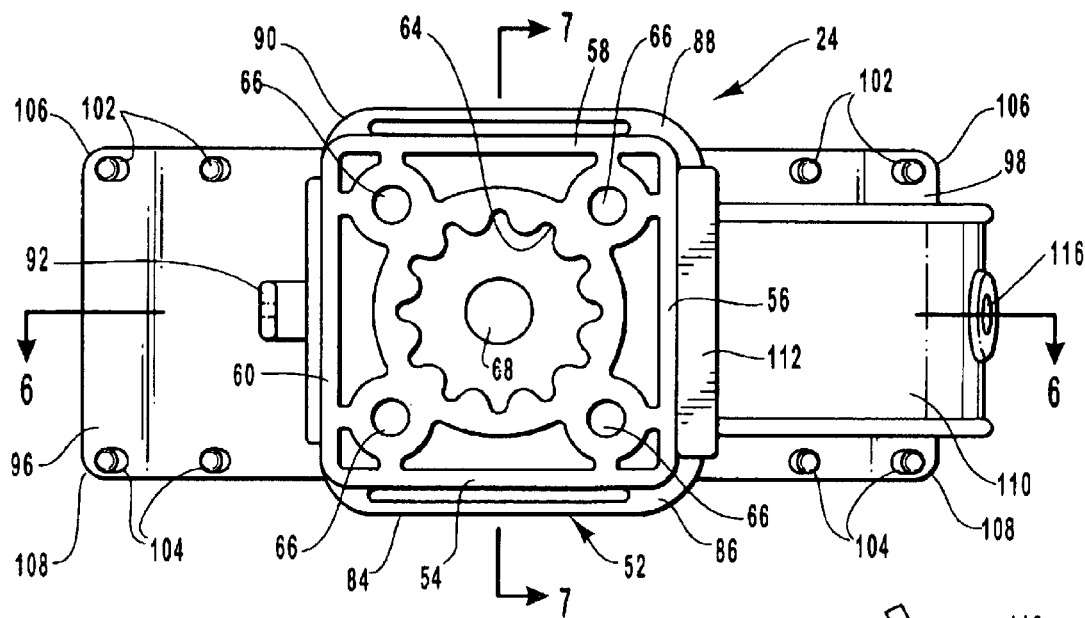
FIG. 4, a top plan view of an article holder of the holder base system.
Figure 5:
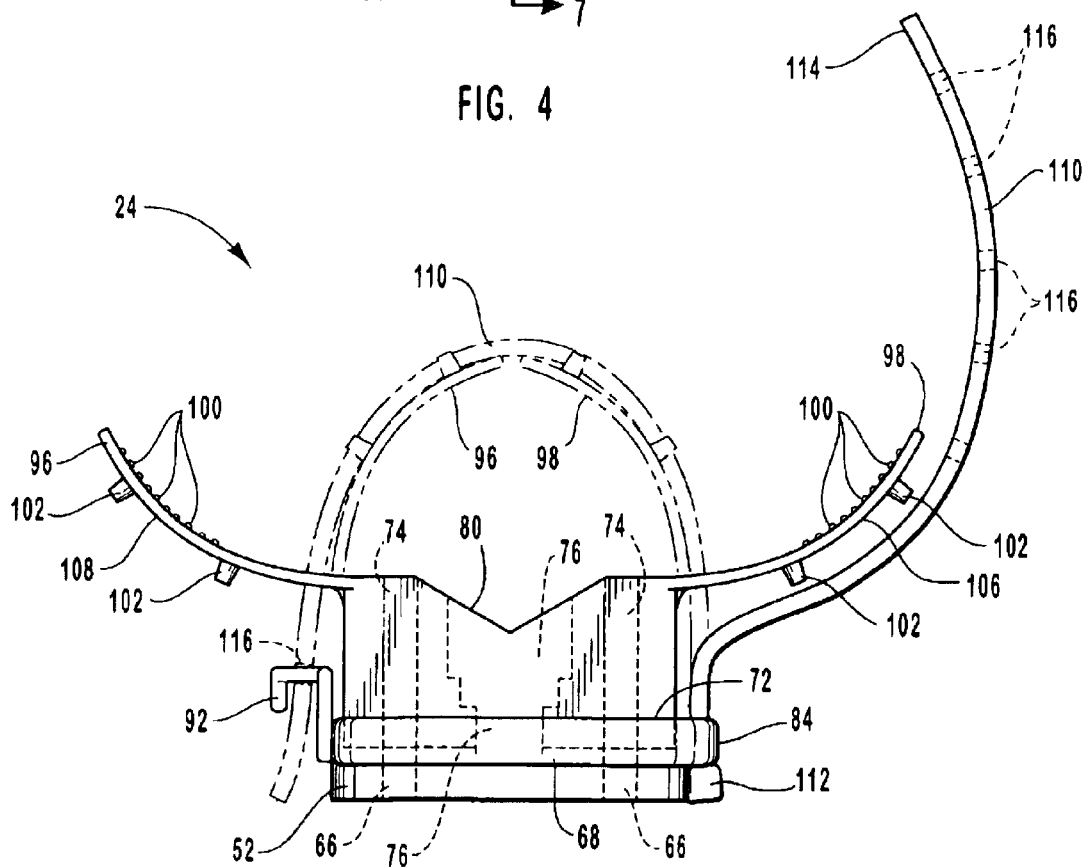
FIG. 5, a side elevation view of the article holder of FIG. 4.
Figure 6:
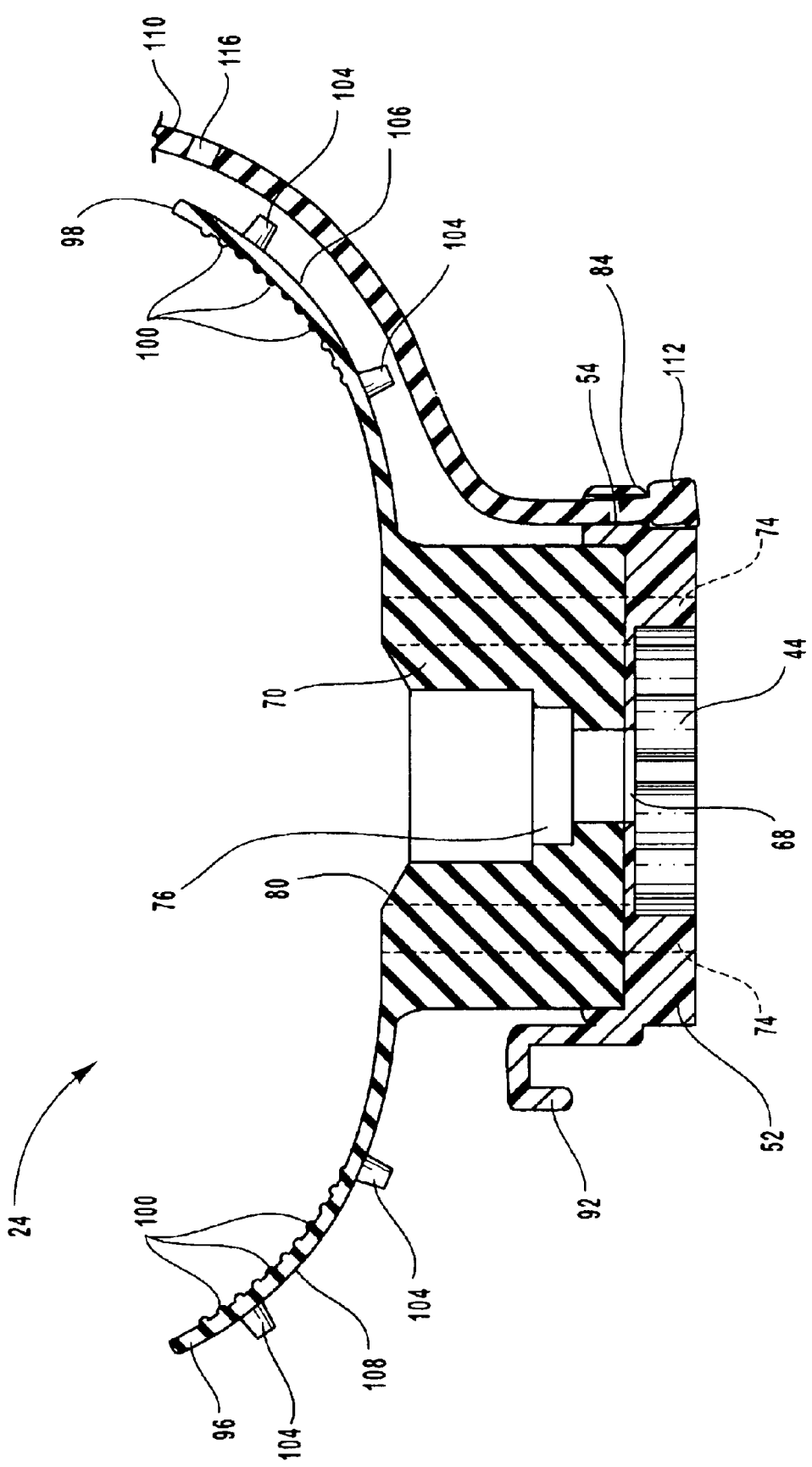
FIG. 6, a vertical section, taken on the line 6—6 of FIG. 4.
Figure 7:
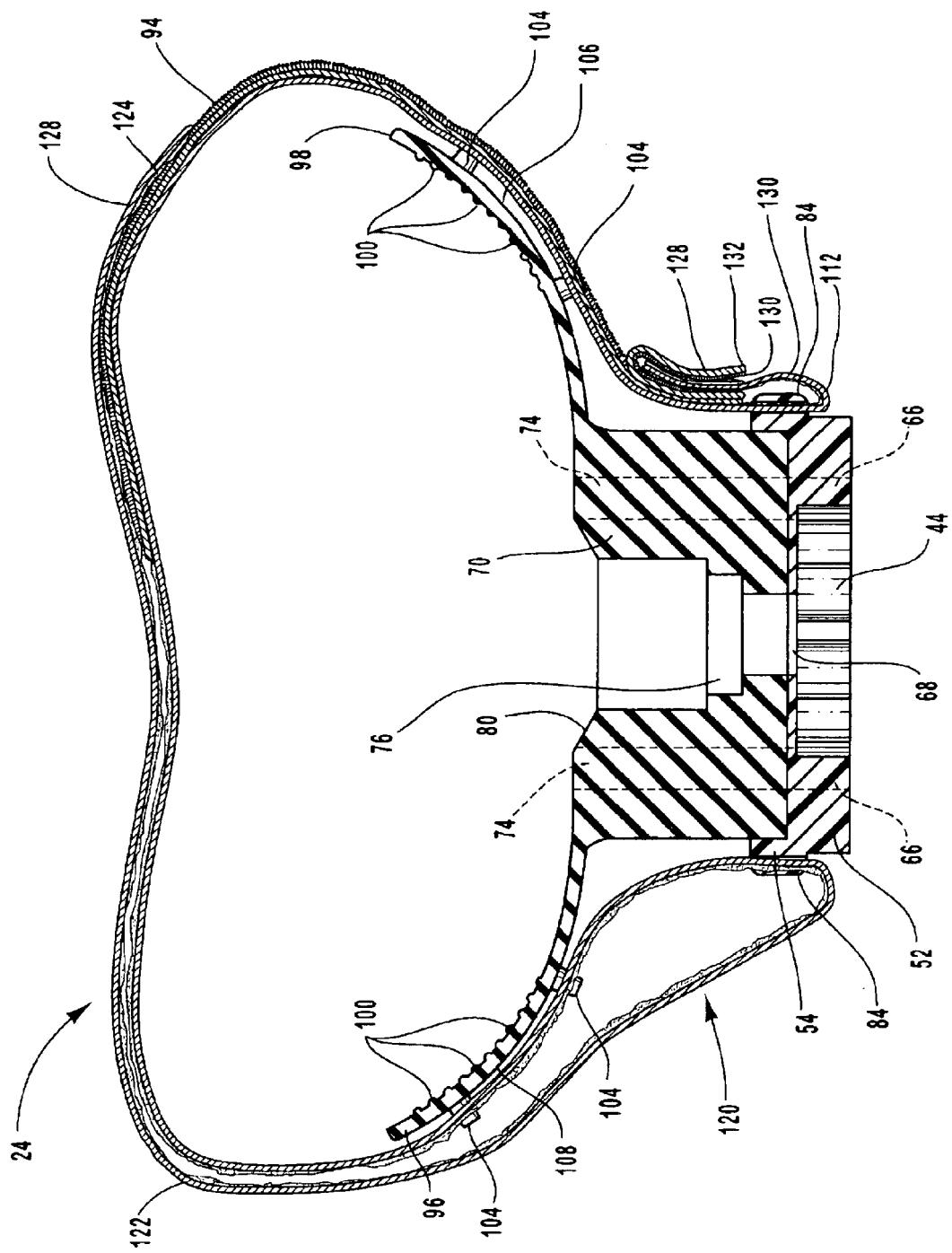
FIG. 7, a vertical section, taken on the line 7—7 of FIG. 4, but showing another embodiment of article holding strap.

Article holder 24 includes a socket 52, FIG. 4, which may be of square configuration, having side walls 54, 56, 58 and 60, surrounding a circular recess with a splined inner wall 64. A hole 66 passes through the socket at each side wall intersection and between the side walls and the splined inner wall 64. Another hole 68 is passed centrally through the socket 52.

A resilient block 70 fits snugly into the top 72 of socket 52. The block 70 has corner holes 74 therethrough to align with the holes 66 in the socket 52 and a central hole 76 therethrough to align with the central hole 68 through the socket 52. Each of the holes 74 and hole 76 are counterbored to receive a nut, not shown, into which bolts inserted through the aligned holes in the socket 52 are turned to secure the socket to the block 70. A V-notch 80 is formed in the bottom of block 70 such that the bottom of the block will straddle a portion of a curved or other appropriately shaped surface to which the holding base system 20 is attached.

A rigid band 84 extends around the side walls 54, 56, 58, and 60, with the band being connected to the walls at corners 86, 88, and 90 and spaced from the walls 54, 56, and 58 and with the band fixed to and extending across the wall 60. A hook 92 is formed with and projects from the band 84, centrally of wall 60.

Gripper straps 96 and 98 are formed integral with the block 70, with the straps each extending from an opposite edge of the block 70 and parallel to V-notch 80. Each gripper strap is formed to curve away from the block 70 and each has raised parallel ribs 100 on one face to engage an article to be secured by the holding base system. A pair of spaced apart projections 102 and 104 are formed at opposite sides 106 and 108 of the other faces of each of the gripper straps 96 and 98 to assist in alignment of an article securement strap, such as strap 110, used to secure an article to the holding base system.

Article securement strap 110, made of rubber, or the like, is capable of being stretched and upon being released will return to its original shape and length. Strap 110 has a head 112 formed on one end, is tapered at the opposite end 114 and has a series of holes 116 spaced along the length thereof.

The end 114 of strap 110 is inserted through the opening formed between band 84 and wall 56 and the strap is pulled through the opening until head 112 of the strap engages band 84 to prevent the strap from being pulled fully through the space. Strap 110 will then pass around gripper strap 96, between the projections 102 and 104 and around gripper strap 98 and between the projections 102 and 104 thereon, so that the strap 110 can be pulled to position the gripper straps around an article to be secured to the holding base system and until the stretched strap 110 is positioned such that a hole 116 fits over the hook 92 of band 84.

Alternatively, an article securement strap 120 (FIG. 7) can be used in place of the strap 110, merely by rotating the block 70 a quarter turn inside the rigid band 84 so that the strap 120 will be properly aligned with the gripper straps 96 and 98. Strap 120 is a strong, flexible fabric material 122, with a loop material 124 on one face and with an end 126 turned back and the end sewn such that the end 126 has looped material on both faces of the strap. A flap 128 of strap material, having hook material 130 on one face thereof, is fixed to the strap 120 at a portion adjacent to the turned back end 126 and has a locking end 132 extending away from the strap 120. When used with the socket 52 and resilient block 70 the end 126 of strap 120 is inserted through the space between a side wall 54 or 58 and rigid band 84 and away from the flexible gripper strap 96 or 98 adjacent to such side wall and then is folded back to engage the inserted loop portion with the hook portion 130 of the flap 128. The hooks on the locking portion are then engaged with the loops on the turned back end 126 of the strap. The free end of the strap 120 is passed around the gripper straps 96 and 98, between the projections 102 and 104 on the gripper straps and around an article to be secured. The free end of strap 120 passes through the space between the other side wall 54 or 58 and rigid band 84 and is snugged tight around the surface before being turned back to engage the looped material on the free end with hook material 94 sewn to and overlying looped material adjacent to the flap 128.

Use of strap 110 or of strap 120 is determined by the nature of the article to be secured and is a matter of choice by the user. With either independent strap the flexible gripper straps are held tightly against the article to be secured.

Figure 8:
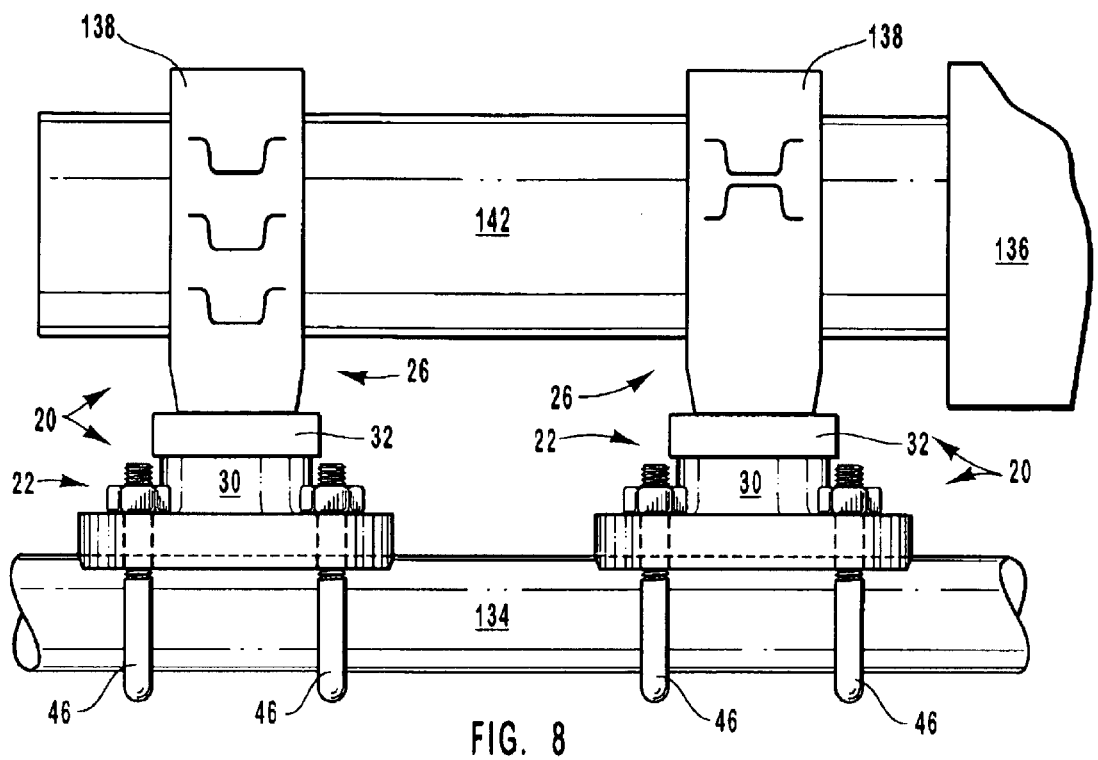
FIG. 8, a side elevation view of a pair of holding base units with bifurcated arms and angled vanes of the holding base system of the invention, with an article secured by the article holders and the base units secured to a bar of a vehicle rack, shown fragmentarily.
Figure 9:
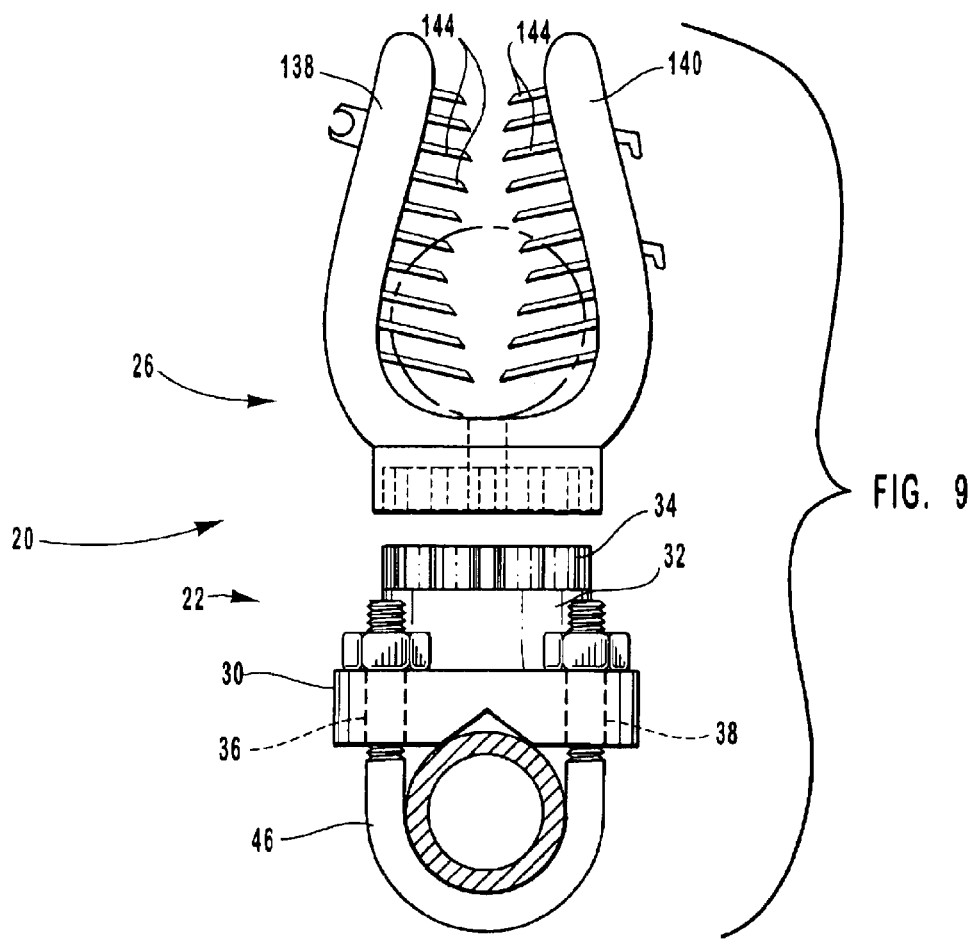
FIG. 9, a vertical section, taken on the line 9—9 of FIG. 8 and with the article holder shown exploded from the holding base unit and the article shown in phantom, for clarity.
Figure 10:
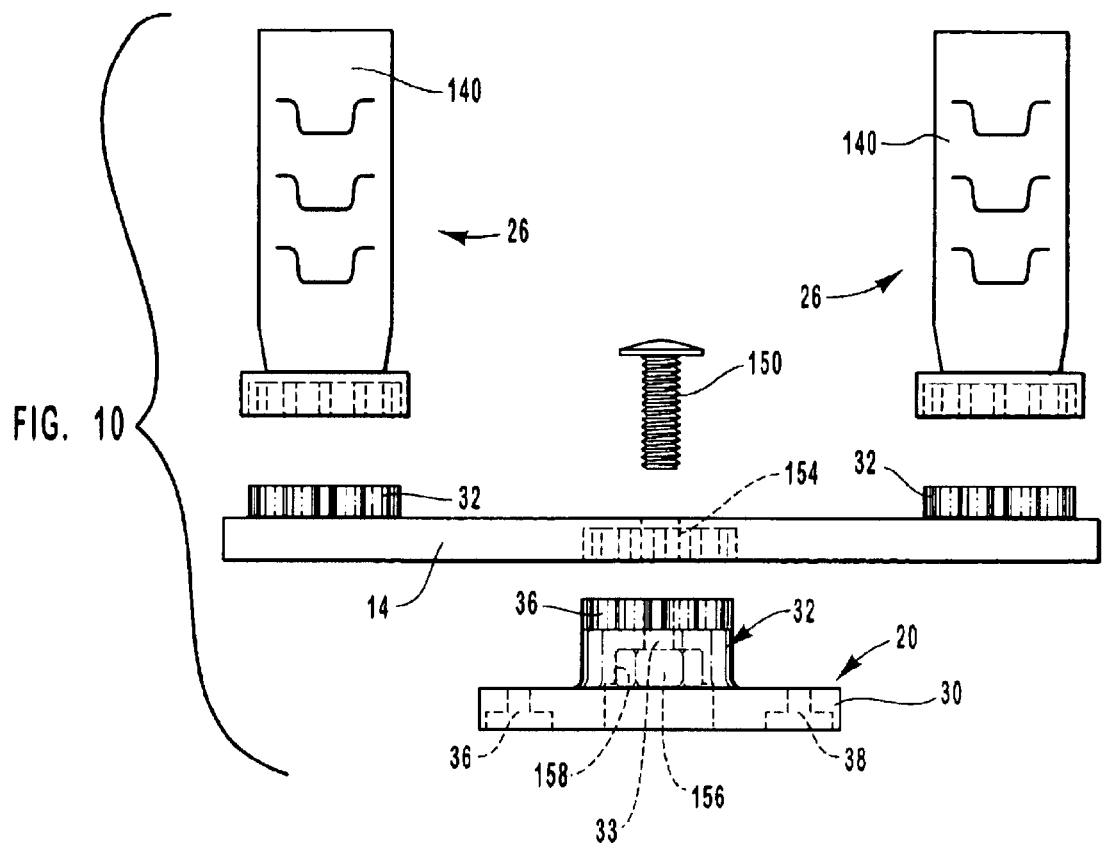
FIG. 10, an exploded end elevation view of a holding base system including holding base unit, cross-bar adapter, and a pair of article holders having bifurcated arms, with flexible vanes.
Figure 11:
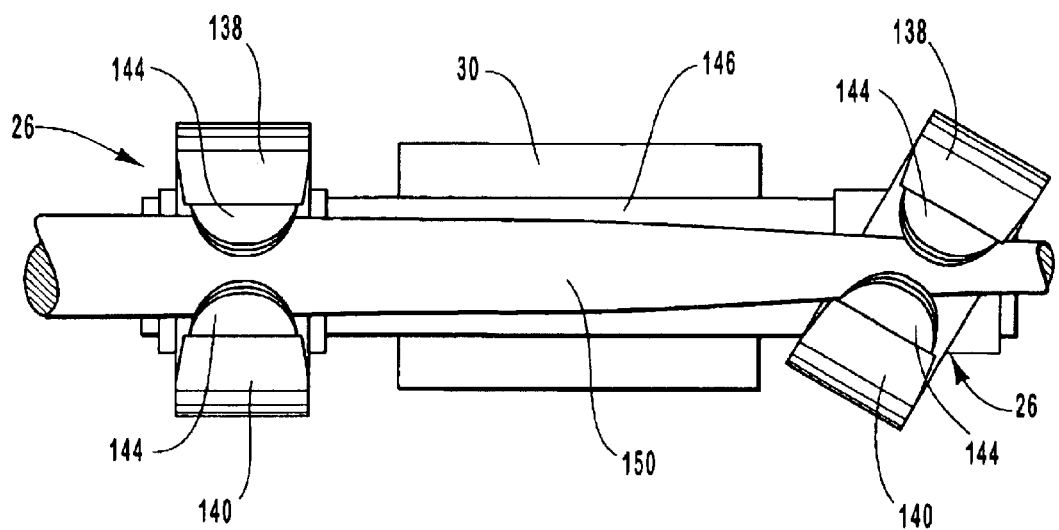
FIG. 11, a top plan view of the holding base system of FIG. 10, but showing one article holder rotated to accomodate secure, wedged holding of an article.

As best seen in FIGS. 8 and 9 a plurality of spaced apart base holding units 22 (shown as two units) are mounted to a bar 134 forming part of a vehicle support rack and receive a shovel 136 (shown fragmentarily). Each base holding unit has an article holder 26 fixed thereto, with bifurcated arms 138 and 140 of the article holders aligned to receive the handle 142 of the shovel and with the downwardly inclined flexible vanes 144 of the article holders securing the handle in place.

Individual base holding units 22 of the holding base system can easily receive and hold articles having cooperating socket members, article holders 26 and articles secured to the article holders. Alternatively, a spaced apart pair of article holders 26 can be mounted on a cross bar 146 with spaced apart splined shafts 32, FIGS. 10 and 11. The cooperating splines on the shafts 32 and in the sockets 52 allow the article holders 26 to be rotated, as desired, relative to the splined shafts of the base holding units. Consequently, the bifurcated arms 138 and 140 of the spaced apart article holders can be set to provide for wedging of an article (fishing pole 150) held by the bifurcated arms. The spaced apart article holders 26 insure secure, wedged holding, whether or not the bifurcated arms include downwardly extending flexible vanes. Bolts 152, inserted through central holes 154 through the splined shafts 32 and central holes 68 through the splined sockets 52 are tightened into nuts 156 in the counterbores 158 of base holding units 20 to secure the article holders to the base holding units.

Although preferred embodiments of the invention have been herein disclosed, it is to be understood that such disclosure is by way of example and that other variations are possible without departing from the subject matter coming within the scope of the following claims, which claims define my invention.

We claim:

1. A holding base system comprising
    at least one base unit including:
        a platform having a top surface and a bottom with a V-notch formed in the bottom surface and extending across said platform;
        means for securing said V-notch of said platform to a tubular surface;
        an exteriorly splined shaft extending from said top surface of said platform; and
    at least one article holder including:
        an interiorly splined socket fitting over and cooperating with said exteriorly splined shaft; and
        bifurcated arms fixed at end extending from opposite sides of said interiorly splined socket.

2. A holding base system as in claim 1, wherein the bifurcated arms each have at least one flexible vane fixed thereto and extending inwardly towards the opposite one of said bifurcated arms and towards said socket.

3. A holding base system as in claim 1,
    wherein said at least one base unit comprises a pair of base units;
    connector means interconnecting said pair of base units;
    said at least one article holder comprises an article holder secured to each of said base units; and
    means for adjusting the angular relationship of at least one of said article holders relative to the base unit to which said one article holder is secured.

4. A holding base system as in claim 1, including
    a plurality of flexible vanes on each of said bifurcated arms and each said vane extending inwardly from an arm towards the other said arm and downwardly towards the socket.

5. A holding base system as in claim 1, further including means for securing an article inserted downwardly between the bifurcated arms.

6. A holding base system comprising
    a base unit including
        a platform having a top surface and a bottom surface with a V-notch formed in the bottom surface and extending across said platform, said v-notch having converging side surfaces defined within the platform;
        an attachment device configured to secure said V-notch of said platform to a tubular surface, wherein the attachment device maintains the tubular surface in contact with the converging side surfaces of the V-notch;
        an exteriorly splined shaft extending from said top surface of said platform; and
    an article holder including
        an interiorly splined socket fitting over and cooperating with said exteriorly splined shaft; and
        bifurcated arms fixed at and extending from opposite sides of said interiorly splined socket.

7. A holding base system as in claim 6, wherein the bifurcated arms each have at least one flexible vane fixed thereto and extending inwardly towards the opposite one of said bifurcated arms and towards said socket.

8. A holding base system as in claim 6, further including
    a pair of base units;
    connector means interconnecting said pair of base units;
    an article holder secured to each of said base units; and
    means for adjusting the angular relationship of at least one of said article holders relative to the base unit to which said one article holder is secured.

9. A holding base system as in claim 6 including
    a plurality of flexible vanes on each of said bifurcated arms and each said vane extending inwardly from an arm towards the other said arm and downwardly towards the socket.

10. A holding base system as in claim 6, further including means for securing an article inserted downwardly between the bifurcated arms.

* * * * *

UNITED STATES PATENT AND TRADEMARK OFFICE
CERTIFICATE OF CORRECTION

PATENT NO. : 7,100,808 B2
APPLICATION NO. : 10/035290
DATED : September 5, 2006
INVENTOR(S) : Hancock et al.

It is certified that error appears in the above-identified patent and that said Letters Patent is hereby corrected as shown below:

Title page, Item (56) References Cited, U.S. Patent Documents: insert the following omitted U.S. patents and publications in appropriate order:

--2003/0038150 A1    02/2003    Williams
5,316,192    05/1994    Ng
5,765,699    06/1998    Griffin
5,957,352    09/1999    Gares
6,626,339    09/2003    Gates et al.
6,641,014    11/2003    McNalley
2003/0168484 A1    09/2003    Gates et al.
2004/0020954 A1    02/2004    Gates et al.--

Title page, Item (56) References Cited, Other Publications: insert the following omitted publications in appropriate order:

--Rugged Gear Single Hook ATV Rack; http://web.archive.org/web/20000613220655/http://www.ruggedgear.com; January 8, 2005; 1 page.

Rugged Gear Double Hook ATV Rack; http://web.archive.org/web/20000616171814/www.ruggedgear.com/page28.htm; January 17, 2005; 1 page.

Rugged Gear ATV Rack — Double Hook; Part Information/Description sheet; Last Revised Date June 1, 1999; 1 page.

All Rite Products, Inc. illustration; circa 1986; 1 page.

All Rite Products, Inc. illustration; circa 1997; 1 page.

Rugged Gear Catalog (brochure from website); www.ruggedgear.com; January 2005; 7 pages.

Kolpin gun Grips II Mounting Instructions, May 17, 2005, 1 page.

Kolpin Gun Grips http://atvs.ridegear.com/page 1, May 18, 2005.--

UNITED STATES PATENT AND TRADEMARK OFFICE
CERTIFICATE OF CORRECTION

PATENT NO. : 7,100,808 B2
APPLICATION NO. : 10/035290
DATED : September 5, 2006
INVENTOR(S) : Hancock et al.

It is certified that error appears in the above-identified patent and that said Letters Patent is hereby corrected as shown below:

Drawings, Sheet 1 of 6: Delete Drawings Sheet 1 of 6 and replace with the following drawing:

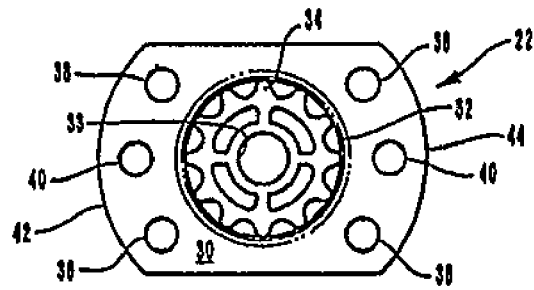

FIG. 1

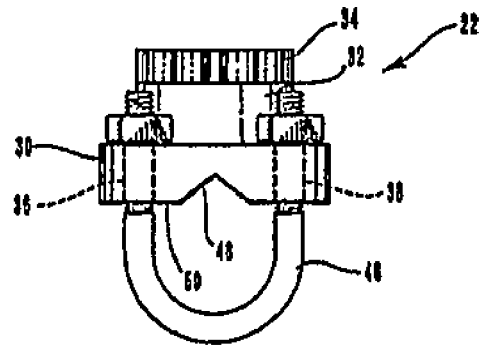

FIG. 2

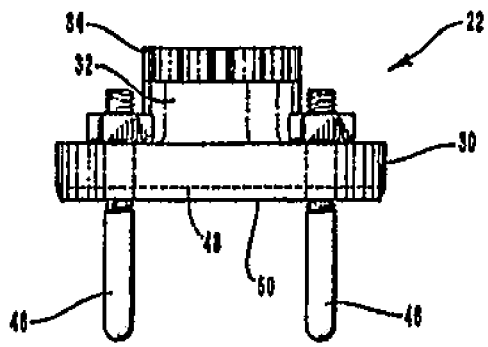

FIG. 3

UNITED STATES PATENT AND TRADEMARK OFFICE
CERTIFICATE OF CORRECTION

PATENT NO. : 7,100,808 B2 Page 3 of 8
APPLICATION NO. : 10/035290
DATED : September 5, 2006
INVENTOR(S) : Hancock et al.

It is certified that error appears in the above-identified patent and that said Letters Patent is hereby corrected as shown below:

Drawings, Sheet 2 of 6: Delete Drawings Sheet 2 of 6 and replace with the following drawing:

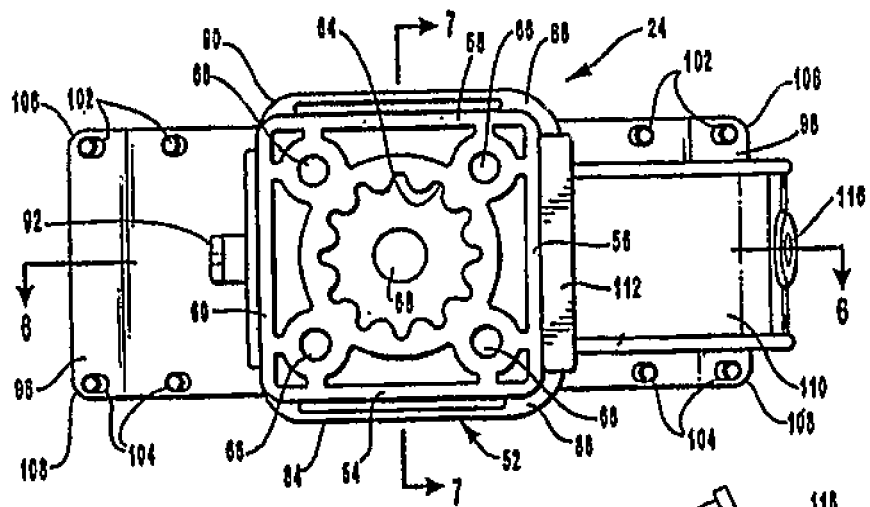

FIG. 4

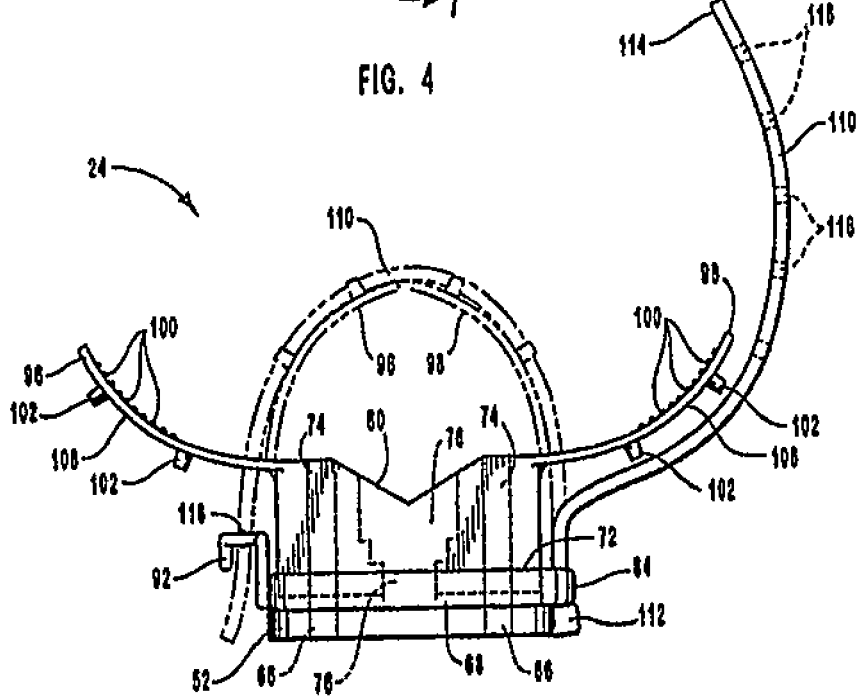

FIG. 5

UNITED STATES PATENT AND TRADEMARK OFFICE
CERTIFICATE OF CORRECTION

| | | |
|---|---|---|
| PATENT NO. | : 7,100,808 B2 | Page 4 of 8 |
| APPLICATION NO. | : 10/035290 | |
| DATED | : September 5, 2006 | |
| INVENTOR(S) | : Hancock et al. | |

It is certified that error appears in the above-identified patent and that said Letters Patent is hereby corrected as shown below:

Drawings, Sheet 3 of 6: Delete Drawings Sheet 3 of 6 and replace with the following drawing:

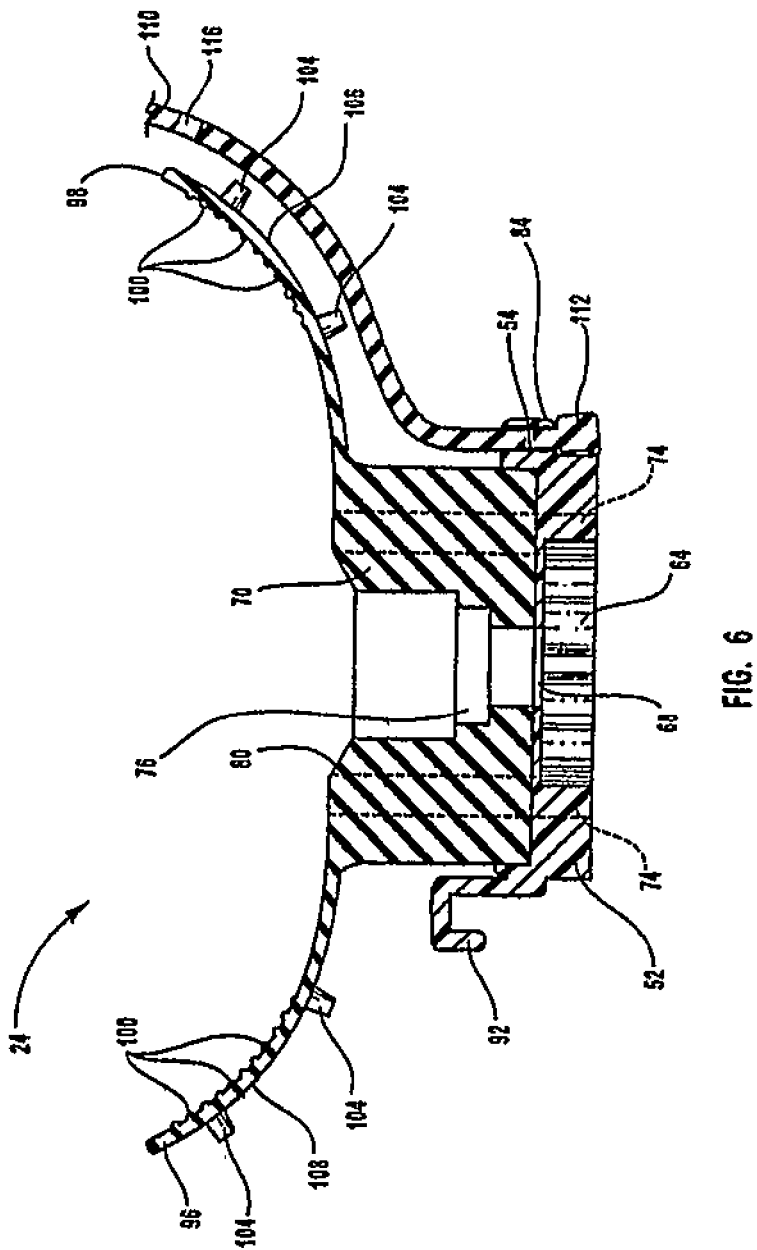

UNITED STATES PATENT AND TRADEMARK OFFICE
CERTIFICATE OF CORRECTION

PATENT NO. : 7,100,808 B2
APPLICATION NO. : 10/035290
DATED : September 5, 2006
INVENTOR(S) : Hancock et al.

Page 5 of 8

It is certified that error appears in the above-identified patent and that said Letters Patent is hereby corrected as shown below:

Drawings, Sheet 4 of 6: Delete Drawings Sheet 4 of 6 and replace with the following drawing:

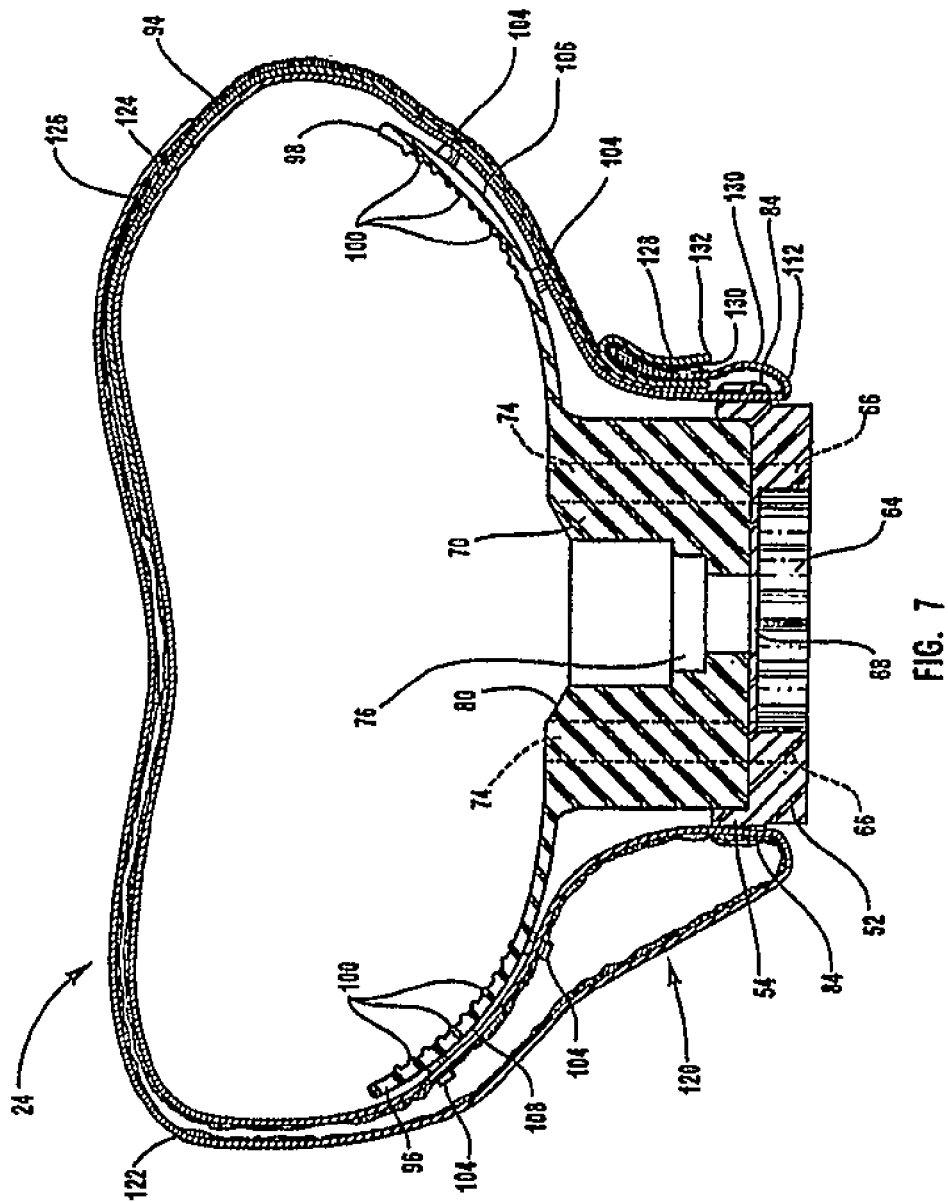

UNITED STATES PATENT AND TRADEMARK OFFICE
CERTIFICATE OF CORRECTION

PATENT NO. : 7,100,808 B2
APPLICATION NO. : 10/035290
DATED : September 5, 2006
INVENTOR(S) : Hancock et al.

It is certified that error appears in the above-identified patent and that said Letters Patent is hereby corrected as shown below:

Drawings, Sheet 5 of 6: Delete Drawings Sheet 5 of 6 and replace with the following drawing:

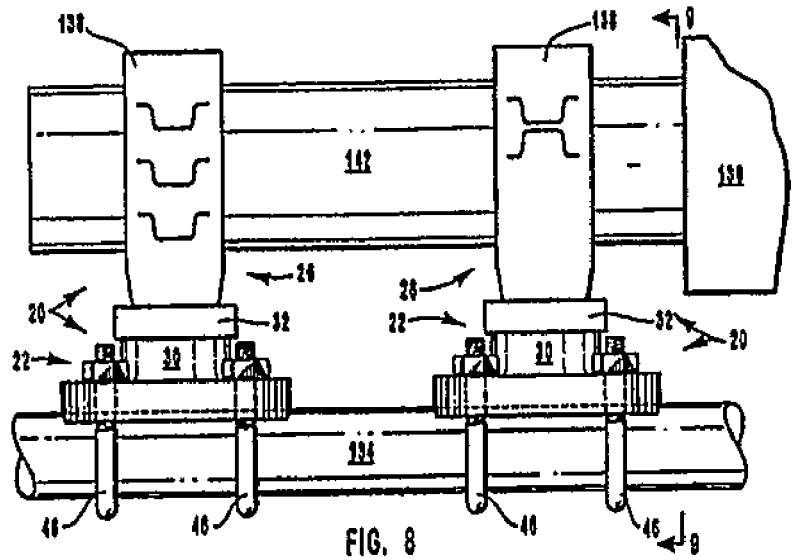

FIG. 8

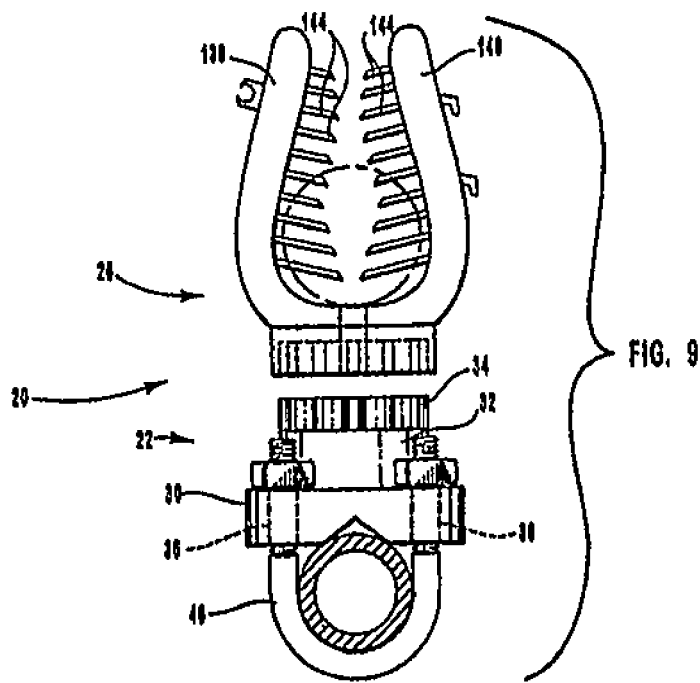

FIG. 9

UNITED STATES PATENT AND TRADEMARK OFFICE
CERTIFICATE OF CORRECTION

PATENT NO. : 7,100,808 B2
APPLICATION NO. : 10/035290
DATED : September 5, 2006
INVENTOR(S) : Hancock et al.

It is certified that error appears in the above-identified patent and that said Letters Patent is hereby corrected as shown below:

Drawings, Sheet 6 of 6: Delete Drawings Sheet 6 of 6 and replace with the following drawing:

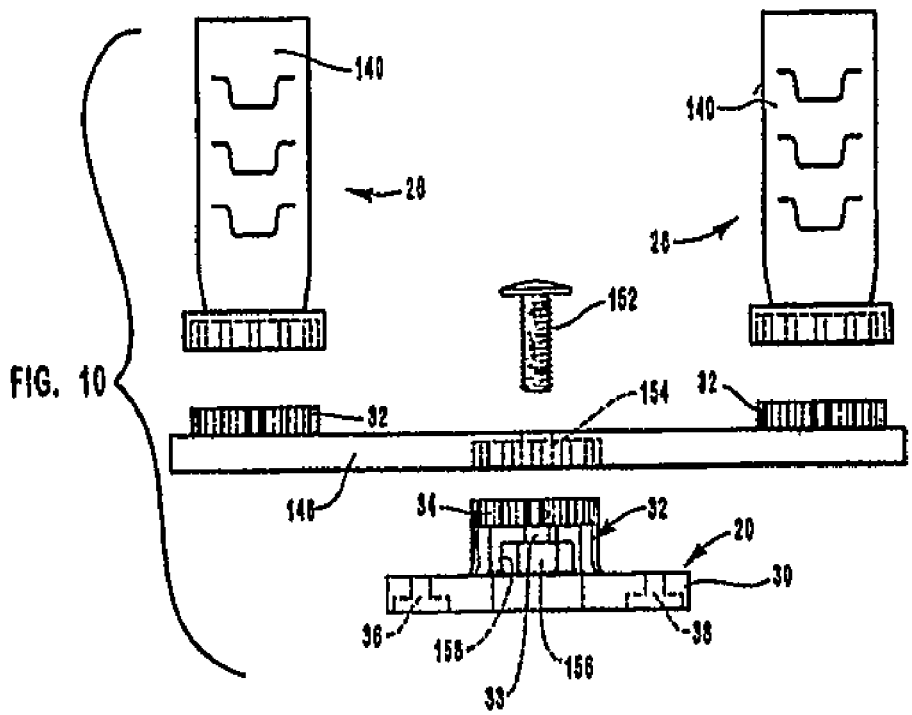

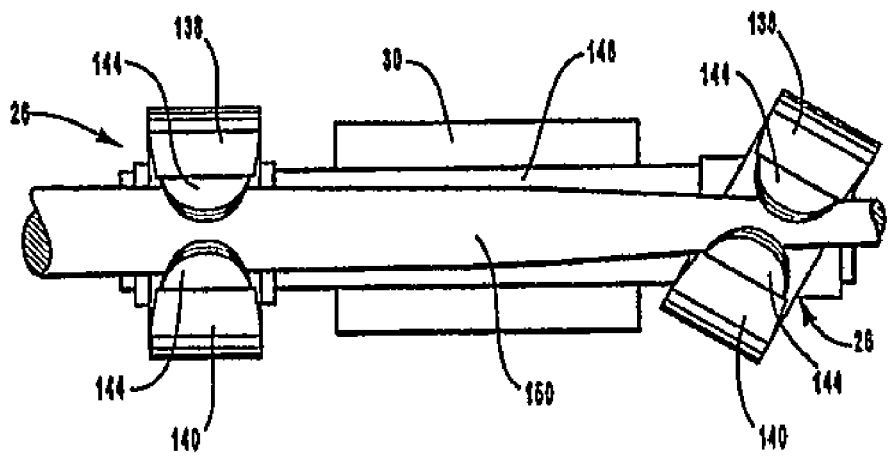

UNITED STATES PATENT AND TRADEMARK OFFICE
CERTIFICATE OF CORRECTION

| | | |
|---|---|---|
| PATENT NO. | : 7,100,808 B2 | Page 8 of 8 |
| APPLICATION NO. | : 10/035290 | |
| DATED | : September 5, 2006 | |
| INVENTOR(S) | : Hancock et al. | |

It is certified that error appears in the above-identified patent and that said Letters Patent is hereby corrected as shown below:

Col. 3, line 41: "has comer holes 74" should read --has corner holes 74--

Col. 3, line 52: "walls at comers" should read --walls at corners--

Col. 5, line 22, claim 1: "bottom with a" should read --bottom surface with a--

Signed and Sealed this

Tenth Day of July, 2007

JON W. DUDAS
*Director of the United States Patent and Trademark Office*